UNITED STATES PATENT OFFICE.

ADRIAAN WILLEM COSTER VAN VOORHOUT, OF DELFT, NETHERLANDS.

PHENOL-ALDEHYDE CONDENSATION PRODUCT.

1,271,393.            Specification of Letters Patent.          Patented July 2, 1918.

No Drawing. Original application filed December 22, 1916, Serial No. 138,377. Divided and this application filed January 23, 1918. Serial No. 213,389.

*To all whom it may concern:*

Be it known that I, ADRIAAN WILLEM COSTER VAN VOORHOUT, a subject of the Queen of the Netherlands, residing at Delft, Province of Zuid-Holland, in the Kingdom of the Netherlands, have invented certain new and useful Improvements in Phenol-Aldehyde Condensation Products, of which the following is a specification.

This invention relates to phenol aldehyde condensation products, and is a division of my prior application, Serial No. 138,377, filed on or about December 22, 1916.

It is known, that phenol forms condensation products with formaldehyde, particularly if catalysts or accelerators are present. It is also known that this reaction proceeds most smoothly and yields the best products when small quantities of alkaline catalysts are used. In this case the first condensation-product is an oily liquid, which becomes semi-solid as the reaction proceeds. If the reaction proceeds still further, this first condensation-product is converted into an infusible, insoluble product possessing great solidity and resistance to the action of most chemicals.

Great difficulties had to be overcome in converting the mass into this latter modification. When the condensation into the desired final product is carried out at temperatures about 100° C. such temperatures being necessary in order that the reaction may proceed with a reasonable velocity, a large volume of vapors are evolved, which cause the final product to have a sponge-like structure and make it unsuitable for most purposes. This may be prevented by carrying out the reaction in the presence of alkaline catalysts at low temperatures (80° C., slowly rising during the reaction. See Baekeland: Recent Developments in Bakelite, *Chemical News* 1912, page 183). When treating large volumes this process has however the drawback, that it proceeds not only very slowly, but also, in consequence of the liberated heat during the condensation, the temperature may easily rise to a height, at which the evolution of vapors begins and again a sponge-like structure is obtained. In order to prevent this, Baekeland has proposed to let the final condensation take place under pressure and prefers this method to all others. (See the above cited literature). By this counterpressure the evolution of vapors is prevented and the mass hardens without foaming. It is therefore possible to work at higher temperatures (110 to 140° C. and higher) by which a very considerable saving in time is effected.

This process however has the following drawbacks: On account of the volatile products, which are formed during the reaction, particularly the water, being prevented by the counter-pressure from escaping from the final product, this later becomes more or less brittle. Also it is only possible to obtain water-clear, transparent products with this method, if pure crystallized phenol is used and even then only if the thickness of the object is relatively small, because the water formed during the reaction remains in the mass and makes it turbid. When using the cresols instead of phenol in this process, it is altogether impossible to obtain a transparent product.

The object of the invention is to overcome these drawbacks and to obtain on the one hand products which are much less brittle than the products obtained according to Baekeland's method and on the other hand to be able to use also the cresols for obtaining water-clear, transparent odorless products of any size.

The invention is based upon the following considerations:

If formaldehyde reacts upon a phenol, *e. g.*, cresol, water is formed. In order to obtain a quite homogeneous product, this water should be eliminated in one way or other from the solidifying mass. In addition to the water, formed during the reaction there is also present the water in which the fomaldehyde and the alkaline catalyst are dissolved, and this also should be eliminated. Furthermore it should be considered, that by continuous heating of the first condensation product, in consequence of the heat liberated during condensation, there is a tendency of the whole mass to solidify suddenly with violent foaming,—giving a worthless product. This may occur *e. g.* when heating in a reflux condenser, as described in the American Patent 942809, page 2, lines 35–40. Baekeland prevents this sudden soldifying in the first place by discontinuing the heating.

In the description of his process he states that in a heated closed vessel, which may be provided with a reflux condenser, two layers are formed. The upper layer contains a little formaldehyde in aqueous solution and the other layer the condensation product in which the alkaline catalyst is dissolved. The first condensation product may become more or less thick by continued heating and is then converted into the final product. This last conversion is carried out under pressure. According to Baekeland this pressure neutralizes the vapor-pressure of the formaldehyde which increases largely at the high temperature during the condensation process. In reality however, this counter-pressure prevents the water, formed by the condensation after the elimination of the solvent water, to evaporate out of the hardening mass, notwithstanding the high temperature (Baekeland mentions 120–200° C. and even higher). The water bubbles in the hardened mass, making it opaque and (as is evident) also brittle, which are both undesirable qualities in the final product. If all the water, which has been used as a solvent, has been evaporated and the condensation between formaldehyde and cresol proceeds, much heat is generated which causes a heavy pressure of the formaldehyde vapor. As already remarked the counter-pressure used by Baekeland prevents the escape of formaldehyde, but also makes it impossible for the water to escape in the form of steam or vapor out of the mass, which becomes very hard. The evaporation of the solvent water for the formaldehyde and the alkaline catalyzer is effected at ordinary pressure at temperatures of 100–105° C. When this water is evaporated (about 30% of the total quantity of cresol+formaldehyde-solution if equal parts of cresol or phenol and 40% formaldehyde-solution are taken) and heating is continued, a sudden condensation will take place under foaming, during which the temperature rises to e. g. 215° C. and the whole mass becomes so hard, that it is only possible to take the hardened mass out of the vessel by the use of a pinch bar.

According to the present invention the first condensation-product is not wholly freed from water and is afterward mixed with a liquid preventing too great a rise of temperature; together with said liquid it is converted slowly at a comparatively low temperature, into the final product.

The invention may be carried out in two different ways, one for making transparent and the other for making opaque products. As already observed the main objection against condensation under pressure is that water remains in the final product, making the mass brittle and opaque. It has been proposed to avoid this drawback by adding 10% of sodium-salicylate to the condensation product. This substance has the property of retaining water in solid solution. In this process however, it is absolutely necessary to dry below 80° C. in consequence of which more water remains in the final product and the time of drying becomes extraordinarily long. The product so obtained is transparent but very brittle and smells strongly of phenol, which causes this process to be technically worthless. Also with respect to this salicylate process my invention is a considerable improvement, because as the final drying takes place above 110° C., all the water can be easily eliminated and a non-brittle, yet transparent product may be obtained. The process is carried out as follows:

In a vessel provided with a steam jacket and a mechanical stirring device, equal quantities of cresol or phenol and formaldehyde-solution (40%) are mixed together with 0.5% solid potassium hydroxid (the caustic alkali may, if desired be dissolved in the cresol first, and then the formaldehyde may be added afterward). Steam is introduced into the steam jacket and under continual stirring the mass is heated and the water distilled off. All of the solvent-water (about 30% of the total charge) and half of the amount of the water, which is formed by the reaction, calculated at about 14% of the total charge (after it has been freed of the solvent-water) is allowed to distill off. The mass then begins to foam up strongly; the steam is shut off and oil of turpentine in volume equal to from 1 to 4 per cent. of the mass, and 2 or 3% glycerin are added, while also a small per cent. of vaseline or the like may be added. This addition prevents the condensation proceeding too quickly. The mass is then cast into molds, the molds brought into drying chambers, through which a current of air is maintained, which carries with it the evolved vapors (oil of turpentine, glycerin, water, formaldehyde and phenol). The temperature in the drying chambers is maintained in the beginning at 60° C. and later on rises to 115–120° and finally to about 180° C. The drying is preferably effected in three periods of about 10 hours each, in such manner that the mass is first dried 10 hours at 60° C., then 10 hours at about 80° C. and finally 10 hours at 115–180° C. During the drying process the mass hardens, but the volatile substances and the water (as well as the water already present as water, formed by the proceeding condensation) have both the opportunity of escaping freely out of the molds, which are open at the top, and the final hardening only takes place when substantially all volatile substances have evaporated.

The product may be colored by adding coloring matters at the same time with the oil of turpentine, glycerin and vaseline. As coloring matters fuchsin, ruby-red, deep-black (hard rubber imitation) methyl-blue, methyl-green, etc., may be used. In this process the sudden foaming is prevented by the addition of oil of turpentine and glycerin; the vaseline is added principally to facilitate the removing of the products out of the molds. As far as it does not exude, it makes the mass opaque.

The products are odorless, very strong, infusible, insoluble, resistant and very suitable for all kinds of objects of art, for insulating purposes, etc.

What I claim is:

1. The process of producing phenol-aldehyde condensation products which comprises heating a mixture of equal parts of a phenol and a 40% solution of formaldehyde and not more than 0.5% of solid caustic alkali until all the free water originally present has been driven off, as well as about one half the amount of water formed in the condensation reaction, adding to the mixture a quantity of turpentine and glycerin equivalent respectively to 1-4% and 2-3% of the phenol used, and thereafter completing the reaction by heating the mass in a current of air at a temperature gradually rising from 60° C. to 180° C.

2. The process of producing phenol-aldehyde condensation products, which comprises heating a mixture of equal parts of a phenol and a 40% solution of formaldehyde and not more than 0.5% of solid caustic alkali until all the free water originally present has been driven off, as well as about one half the amount of water formed in the condensation reaction, adding to the mixture a quantity of turpentine and glycerin equivalent respectively to 1-4% and 2-3% of the phenol used, and a small percentage of vaseline, and thereafter completing the reaction by heating the mass in a current of air at a temperature gradually rising from 60° C. to 180° C.

In testimony whereof I have hereunto set my hand.

ADRIAAN WILLEM COSTER van VOORHOUT.